United States Patent [19]

Göransson et al.

[11] Patent Number: 4,528,883

[45] Date of Patent: Jul. 16, 1985

[54] APPARATUS FOR DIVIDING AERATED CONCRETE BLOCKS

[75] Inventors: Rolf E. Göransson, Åkarp; Oystein Kalvenes, Bjärred, both of Sweden

[73] Assignee: Internationella Siporex AB, Malmo, Sweden

[21] Appl. No.: 472,842

[22] Filed: Mar. 7, 1983

[30] Foreign Application Priority Data

Mar. 29, 1982 [SE] Sweden .............................. 8201996

[51] Int. Cl.³ ............................................ C04B 15/14

[52] U.S. Cl. ......................................... 83/870; 83/92; 83/152; 83/155.1; 83/651.1; 414/41

[58] Field of Search ................................ 83/870–874, 83/23, 78, 86, 87, 89, 90, 91, 92, 93, 94, 96, 152, 519, 107, 155, 155.1, 651.1; 414/41, 42; 264/157

[56] References Cited

U.S. PATENT DOCUMENTS

| | | | |
|---|---|---|---|
| 1,926,997 | 9/1933 | Hoelscher et al. | 82/32 |
| 2,955,717 | 10/1960 | Segur et al. | 414/71 X |
| 3,471,036 | 10/1969 | Thomas et al. | 414/71 X |
| 3,664,089 | 5/1972 | Keck | 53/157 X |
| 3,919,372 | 11/1975 | Vogele | 264/157 X |
| 3,941,639 | 3/1976 | Maroschak | 414/41 X |
| 3,989,235 | 11/1976 | Husges | 414/41 X |
| 4,083,908 | 4/1978 | Kalvenes et al. | 264/82 |
| 4,084,464 | 4/1978 | Bowers | 83/94 |
| 4,174,936 | 11/1979 | Goransson | 425/297 |
| 4,197,077 | 4/1980 | Kalvenes et al. | 425/305.1 |
| 4,298,413 | 11/1981 | Teare | 83/92 X |

FOREIGN PATENT DOCUMENTS

| | | | |
|---|---|---|---|
| 748160 | 8/1970 | Belgium . | |
| 1808749 | 11/1968 | Fed. Rep. of Germany . | |

*Primary Examiner*—James M. Meister

*Attorney, Agent, or Firm*—Fred Philpitt

[57] ABSTRACT

An apparatus for dividing substantially parallelepipedic bodies of only partially cured aerated concrete into smaller pieces comprises a cutter for cutting the bodies along horizontal cutting planes into substantially parallelepipedic pieces having a thickness which is substantially smaller than the original height of the bodies while the bodies rest on horizontal supports. Each of these pieces can be lifted from the remaining part of a respective body and transferred to a further support arranged in a stacking station, by transporter which exerts a suction force to the upper side of the pieces, which pieces are placed one on top of the other in the stacking station, to form a stack intended for insertion into a final-curing station. The apparatus comprises two cutting stations with associated cutters for dividing a respective aerated concrete body, the cutting stations being located adjacent to and on each side of the further support. Each of the cutting stations is co-ordinated with a respective transporter for moving the pieces from respective cutting stations to the further support, which is common to both cutting stations.

18 Claims, 11 Drawing Figures

APPARATUS FOR DIVIDING AERATED CONCRETE BLOCKS

The present invention relates to apparatus for dividing substantially parallelepipedic bodies of only partially cured areated concrete into smaller pieces, said apparatus comprising cutting means for cutting said bodies along horizontal cutting planes into substantially parallelepipedic pieces having a thickness which is substantially smaller than the original height of the bodies, while the bodies rest on horizontal supports, each of said pieces being liftable from a remaining part of a respective body by means of a transport means which applies a suction force to the upper sides of said pieces, and transferrable to a further support which is arranged in a stacking station and on which said pieces are placed one upon the other, to form a stack for insertion into a final-curing plant.

The object of the present invention is to provide a novel and improved apparatus of the aforedescribed kind, by means of which stacks of aerated concrete pieces or slabs for insertion into steam autoclaves can be formed rapidly and automatically.

To this end it is proposed in accordance with the invention that an apparatus of the aforementioned kind includes two cutting stations which each have associated cutting means for dividing a respective aerated concrete body, said cutting stations being located adjacent to and on each side of said further support, and each being co-ordinated with its respective transport means for transporting the pieces from respective cutting stations to the further support, which is common to both cutting stations. In this way there can be formed in a particularly rational manner stacks of aerated concrete pieces of such thinness which, if produced in conventional plants, would cause bottle necks in the production lines; in addition there can also be formed in a particularly rational manner stacks of aerated concrete pieces of mutually different thicknesses and/or densities, particularly in conjunction with the production of aerated concrete items composed of two different kinds of aerated concrete pieces.

According to a particularly suitable embodiment the transport means comprise two box-like substantially horizontal suction beams which can be connected to a source of negative pressure and each of which is arranged in a respective carrier so as to be raisable and lowerable in said carrier, said carrier having the form of carriages, preferably motor-driven carriages arranged for movement along a common path.

Each suction beam may be suspended in an associated carrier by means of chains or like devices, which extend upwardly from the suction beam and are deflected in the same direction around a respective guide wheel, which is journalled for rotation about an axis which extends parallel with the direction of travel of the carrier, and which chains or like devices remote from the suction beam are provided with substantially horizontal parts which are attached to a slide or like device which is mounted in the carrier for movement transversely to its direction of travel, said slide being reciprocatingly movable from a preferably adjustable position relative to the carrier.

The slide may conveniently be driven by a piston-cylinder device or like motor arranged to act between the slide and the carrier.

It may be desirable to smooth the underside of the aerated concrete pieces carried by the suction beams during transportation of said pieces from a cutting station to the stacking station. To this end, each suction beam may be arranged to carry a raisable and lowerable roller arranged for movement along a suction beam, transversally of the transport direction, therewith to roll and smooth said undersides.

Suitably, the supports in the cutting and stacking stations are carried by raisable and lowerable carriers, the carriers in the cutting stations being raisable stepwise in accordance with the thickness of the aerated concrete pieces cut in said stations, and the carrier in the stacking station being lowerable stepwise in accordance with the thickness of the aerated concrete pieces received in said stacking station from a receiving position in which said further support or the uppermost side of aerated concrete pieces supported thereby is located immediately beneath an aerated concrete piece carried by a suction beam which has arrived at the stacking station.

In accordance with a suitable further embodiment of the invention, means are provided for applying to one flat side of selected concrete pieces either a coating of a binding agent or a release agent, which may be in powder form or liquid form, or a sheet of foil. The applicating means may have the form of a carriage or like device arranged for reciprocatory movement in the stacking station transversely of said transport direction, said carriage carrying means for supplying a coating agent to the upper side of at least certain ones of said aerated concrete pieces.

Conveniently, each of the cutting means comprises a cutting wire which extends across respective cutting stations, substantially parallel with said transport direction, between attachments which are carried by a carrier, preferably in the form of a carriage or like device, arranged for movement transversely to said transport direction.

In order to provide a smooth upper surface on the separated concrete pieces, to reduce the adhesion tendencies of said surfaces and to facilitate lifting of the pieces by suction, means may be provided for rolling the upper sides of the aerated concrete bodies on the residual concrete body parts located in respective cutting stations. The rolling means are suitably incorporated with the cutting-wire carrier and, in one particular embodiment of the invention, include rollers arranged to roll over the upper side of the aerated concrete body or body part in front of the cutting wire.

In accordance with another embodiment of the invention, at least one cutting-wire carrier carries a roller which is intended for rolling the upper side of an aerated concrete body or body part, and which can be moved relative to the cutting-wire carrier between positions in which it is located on one or the other side respectively of a cutting wire carried by the cutting-wire carrier.

Alternatively, at least one cutting-wire carrier may carry two rollers, which are located on a respective side of a cutting wire carried by the cutting-wire carrier and which can be brought one at a time, into contact with the upper side of an aerated concrete body or body part.

At times it may be desirable to provide the aerated concrete pieces with shaped edges. To this end at least one of the cutting-wire carriers may have means for profiling the side edges of the aerated concrete pieces extending transversely to said transport direction.

As will be understood, when profiling the edges of the aerated concrete pieces, waste will be formed in varying quantities. In order to remove this waste, the cutting-wire carrier is preferably co-ordinated with means for carrying said waste to waste-collecting stations. Such waste-carrying means may comprise, for example a conveyor belt located on each side of respective cutting stations and extending transversely to the transport direction for separated aerated concrete pieces, the conveyor belts being driven in a direction opposite to the direction of movement of the associated cutting-wire carrier. Preferably, the conveyor belts are endless, and are provided with a substantially horizontal, waste-receiving upper part and a substantially horizontal lower part which is attached to the associated cutting-wire carrier.

In order, among other things, to enable the aerated concrete pieces to be cut into block form, the apparatus according to the invention may be provided with transverse-cutting frames which carry cutting wires extending in the transport direction of separated aerated concrete pieces, for cutting the outermost end parts of the aerated concrete pieces, and optionally for dividing the aerated concrete pieces into blocks while said pieces rest on an underlying body part of aerated concrete. Conveniently, the transverse-cutting frames arranged in respective cutting stations are raisable and lowerable between an upper position in which they permit aerated concrete pieces to be cut from the aerated concrete bodies or body parts by means of said cutting means, and a lower position in which their cutting wires have completely cut through the severed aerated concrete pieces.

For reasons made clear hereinafter, the transverse-cutting frames are preferably adjustable to a position in which they expose the upper side of the severed aerated concrete pieces for co-action with an associated suction beam while the cutting wires of said frames are located above the remaining aerated concrete body parts located beneath the severed aerated concrete pieces. To facilitate the transverse-cutting operation, means may be provided for causing the cutting frames to reciprocate substantially parallel to the direction of the cutting wires of said cutting frames.

In one suitable embodiment of the invention, the apparatus is provided with ingoing tracks extending transversely to the transport direction of the aerated concrete pieces and intended for inserting aerated concrete bodies resting on associated supports into the cutting stations. Means are also provided for removing an outer layer from the upper side of the aerated concrete bodies, and optionally also from the sides of said bodies extending transversely to the transport direction of the aerated concrete pieces, while the aerated concrete bodies move to respective cutting stations.

In accordance with a further embodiment, the transverse-cutting frame may be replaced with or complemented with a transverse-cutting arrangement, according to which at least one of the suction beams carries at least one pair of attachment means, the attachment means of said pair or each pair being located on mutually opposite long sides of said beam, for the attachment of the opposite end portions of a transverse-cutting wire. The attachment means are raisable and lowerable between an upper position, in which the transverse-cutting wire is located contiguous with the underside of the suction beam, and at least one lower position, in which said wire is spaced from the underside of said beam.

Conveniently, the arrangement is such that with the suction beam abutting the upper surface of an aerated concrete piece cut from an aerated concrete body or body part, the attachment means can be lowered, both to a lower position, in which the transverse-cutting wire has completely cut through the aerated concrete piece, and to an intermediate position, in which the transverse-cutting wire is located at a distance above the residual aerated concrete body part lying beneath the severed aerated concrete piece.

In order to prevent scoring a marking of underlying concrete surfaces when cutting transversally, in accordance with one suitable embodiment, each of the attachment means can be raised and lowered individually, and can preferably be moved to and locked in selected positions along the length of the suction beam.

The invention will now be described in more detail with reference to the accompanying drawings, further characteristic features of the invention and advantages afforded thereby being disclosed in conjunction therewith.

Figure 1:
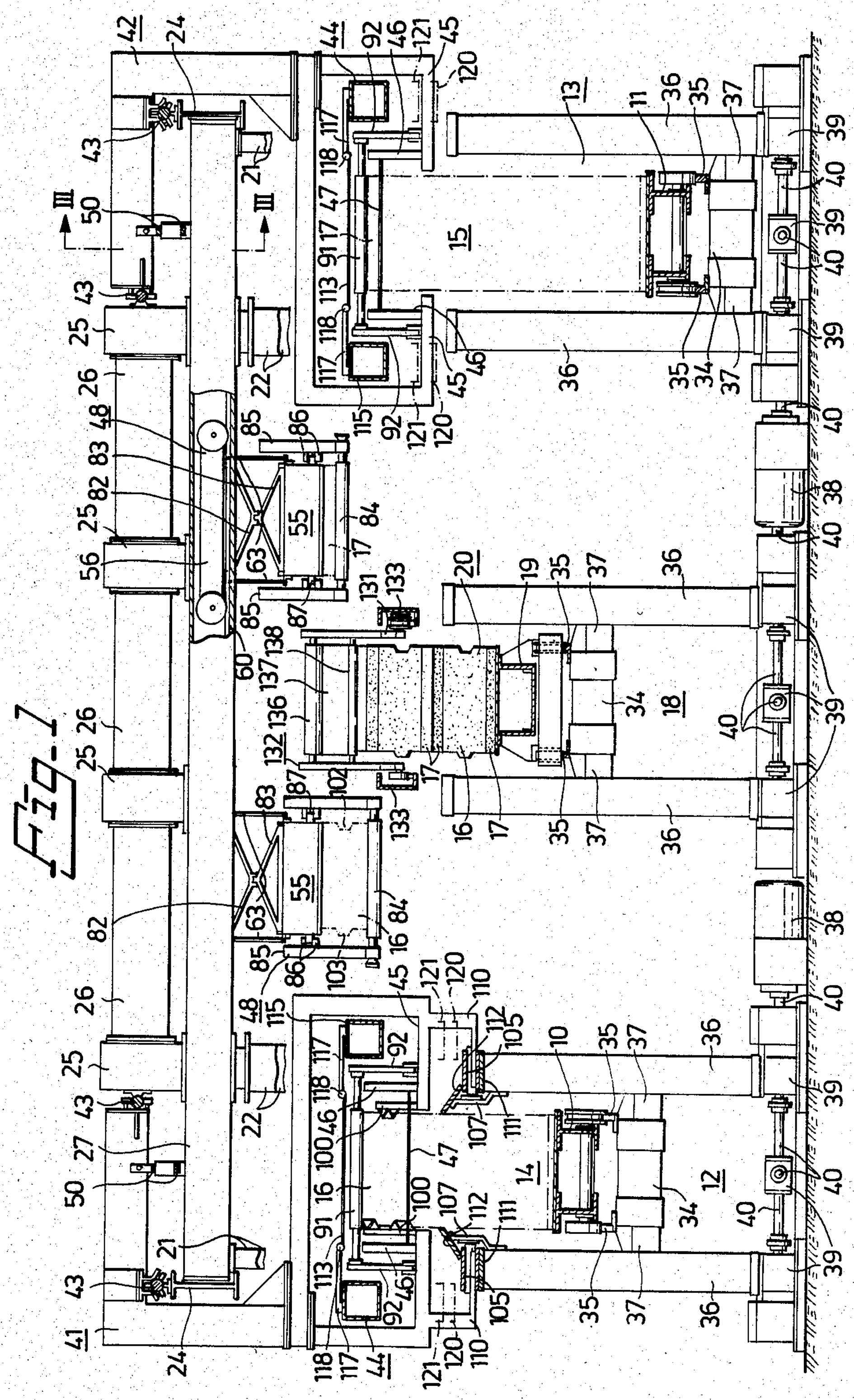
FIG. 1 is an end view, partly in section of an exemplary embodiment of an apparatus according to the invention.

The plant illustrated in the drawings is effective in horizontally dividing two substantially parallelepipedic bodies of partially cured aerated concrete, indicated at 14 and 15, into a plurality of substantially parallelepipedic pieces or slabs 16, 17, the thickness of which is substantially smaller than the original height of the bodies 14, 15. As illustrated, each of the bodies 14, 15 rests on a respective support means 10 and 11 in a respective cutting station 12 and 13. The surfaces of the aerated concrete pieces or slabs 16, 17 are also worked in the apparatus, and said pieces may optionally be cut along vertical cutting planes into blocks, whereupon each of the concrete pieces or all blocks formed from a concrete piece or slab is stacked one at a time, or are stacked altogether respectively on a support means 19 in a stacking station (18) located between the cutting stations 12, 13, it being the intention for the support means 19 to accompany the stack 20 of finally-worked pieces 16, 17 or blocks into and through a steam autoclave (not shown), in which the concrete pieces or blocks are finally cured.

The illustrated apparatus comprises a main frame built of pillars 21, 22 and beams 24–27. The support means 10, 11, 19 comprise carriages on rails, and extending to and from each station 12, 13, 18 are mutually parallel ingoing and outgoing rails or tracks for movement of the carriages 10, 11, 19 to and from respective stations 12, 13, 18. The ingoing and outgoing rails for carriage 10 are shown at 28 and 29 respectively in FIG. 2. The drive means required for moving the carriages 10, 11, 19 to and from respective stations 12, 13, 18 have not been shown in the drawings, so that the drawings can be more easily read. As will also be seen from FIG. 2, in the region where the ingoing rails 28 reach the apparatus means are arranged for cutting an outer layer from the upper side of the aerated concrete body 14 and from vertical sides thereof extending parallel with the rails 28 during passage of the body to the cutting station 12. In the illustrated embodiment, these means comprise a motor-driven cutter 31 (the drive motor not being shown) which is mounted for rotation on a horizontal shaft in a holder means 30, and which is arranged to work the upper side of an advancing aerated concrete body, and a cutting-wire arrangement for each of said vertical sides. Each of the cutting-wire arrangements may include a substantially vertical carrier 32 having arranged thereon cutting-wire attachments with cutting wires 33 extending therebetween, said cutting wires being located in a common vertical plane.

In each of the stations 12, 13, and 18 there is arranged a carrier 34 which carries the support means 10, 11, 19 via rails 35 corresponding to the aforementioned ingoing and outgoing rails. These carriers 34 can be raised and lowered along vertically extending casings 36 via arms 37 which enter respective casings 36 through vertical slots, not shown. The arms 37 may carry nuts which mesh with rotatable, vertical threaded spindles arranged within the casings 36, there being arranged for each station 12, 13, 18 a motor 38, which is connected to the spindles of respective stations 12, 13, 18 via gears 39 and shafts 40, for synchronous driving of said spindles.

Arranged in each of the stations 12 and 13 is a respective carrier in the form of a carriage 41 and 42 arranged for movement in a horizontal path along respective stations between terminal positions in which it is located outside one end or the other respectively of an aerated concrete body 14, 15 resting in the station on a support means 10 or 11. Each carriage 41 and 42 is mounted via wheels on and is guided by guide rods 43, which are carried by horizontal beams 24,25 incorporated in the main frame, and includes a frame structure which, with the carriage 41 or 42 located between said terminal positions, substantially embraces a transverse-cutting frame, which will be described in more detail hereinafter and which is generally shown at 44. Each of said frame structures includes arms 45 which extend towards each other and which carry cutting-wire attachments 46. Extending between the cutting-wire attachments is a cutting wire 47 which is horizontal and which forms a right angle, or almost a right angle, e.g. an angle of 70°–85°, with the direction of travel of the associated carriage 41 or 42. As will be seen when making a comparison between carriages 41 and 42, the cutting wires 47 can be attached at different heights relative the associated attachments 46, the attachment position being selected so that the upper side of the concrete pieces 16, 17 cut in stations 12 and 13 by means of cutting wires 47 are placed in one and the same horizontal plane. When dividing the aerated concrete bodies 14, 15 into said pieces 16, 17 the carriages 41 and 42 are moved backwards and forwards between their terminal positions, the carriers 34 in cutting stations 12, 13 being raised between each cutting operation by an amount corresponding to the thickness of the cut pieces 16, 17. The thus separated pieces 16, 17 are transferred to the stacking station 18 by means of two transport means 48 each of which is co-ordinated with a respective cutting station 12, 13. The carrier 34 in the stacking station 18 can be lowered stepwise, in accordance with the thickness of the aerated concrete pieces there received, from a receiving position in which the support means 19 or the uppermost side of concrete pieces 16, 17 already carried thereon is located immediately beneath a concrete piece 16 or 17 carried by a transport means 48 arriving at the stacking station 18.

Figure 3:
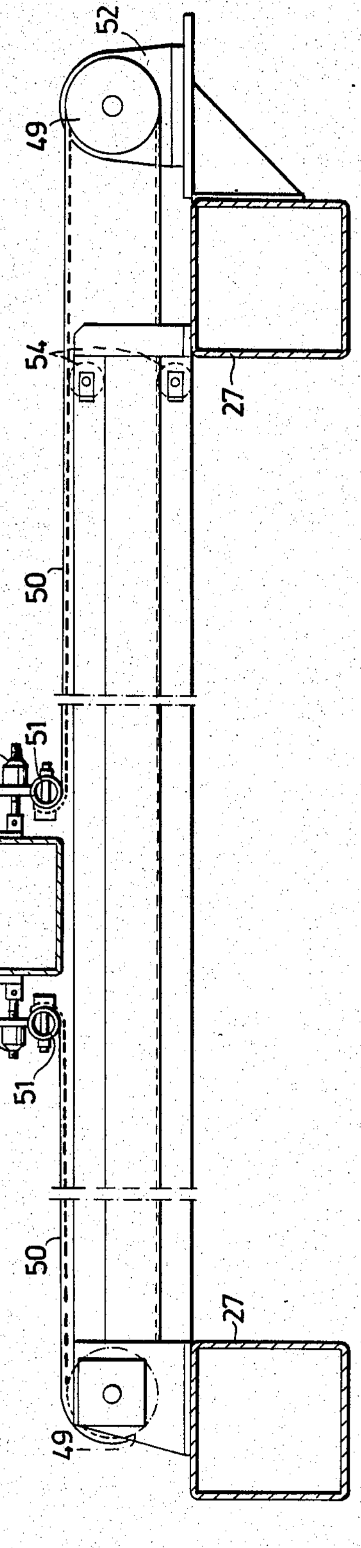
FIG. 3 is a view taken on the line III—III in FIG. 1.

The drive means for carriage 42 is illustrated in FIG. 3, in which drive means two horizontal beams 27, located at mutually opposite ends of the apparatus, support guide wheels 49, around which extend a toothed belt 50 or like device, the ends of which are joined at 51 to the carriage and which can be driven in one or the other direction, while moving the carriage, by means of a motor 52, which is arranged to drive one of the guide wheels 49. The reference 53 identifies schematically illustrated shock absorbers on the carriage 42, said shock absorbers being arranged to co-act with end stops not shown. The reference 54 identifies two of a plurality of a guide and support rollers for belt 50 arranged along the movement path of the carriage 42. The carriage 41 is assumed to be driven in a manner similar to carriage 42.

In the illustrated embodiment, the transport means 48 comprise two substantially horizontal box-like suction beams 55, which can be connected to a source (not shown) of negative pressure, and each of which is carried for vertical up and down movement by a respective carrier. Each such carrier, the design of which can best be seen from FIG. 4, has the form of a wheeled carriage 56, having toothed drive wheels 57, which are mutually connected by a shaft 59 journalled at 58. The carriages 56 are arranged for movement along a common track comprising beams 60 which carry racks or like devices (not shown) for engagement with the drive wheels 57. Each carriage 56 carries a motor 61, which drives the shaft 59, and therewith the drive wheels 57, via a belt transmission 62.

Each suction beam 55 is suspended in an associated carriage 56 by means of four chains 63 (FIGS. 1 and 2) which extend upwardly from the suction beam and which are deflected in mutually the same direction around a respective guide wheel 64. The guide wheels 64 are attached in pairs on shafts 65, which are journalled in a plurality of bearings 66 carried by carriage 56 in a manner such that the wheels 64 can rotate about axes extending parallel with the direction of movement of the carriage 56. The chains 63 have substantially horizontal parts 67 (FIG. 4) which are spaced from the suction beam 55 and which are attached at 68 to a slide 69 which is journalled for sliding movement transversely of the direction in which the carriage 56 moves.

Figure 4:
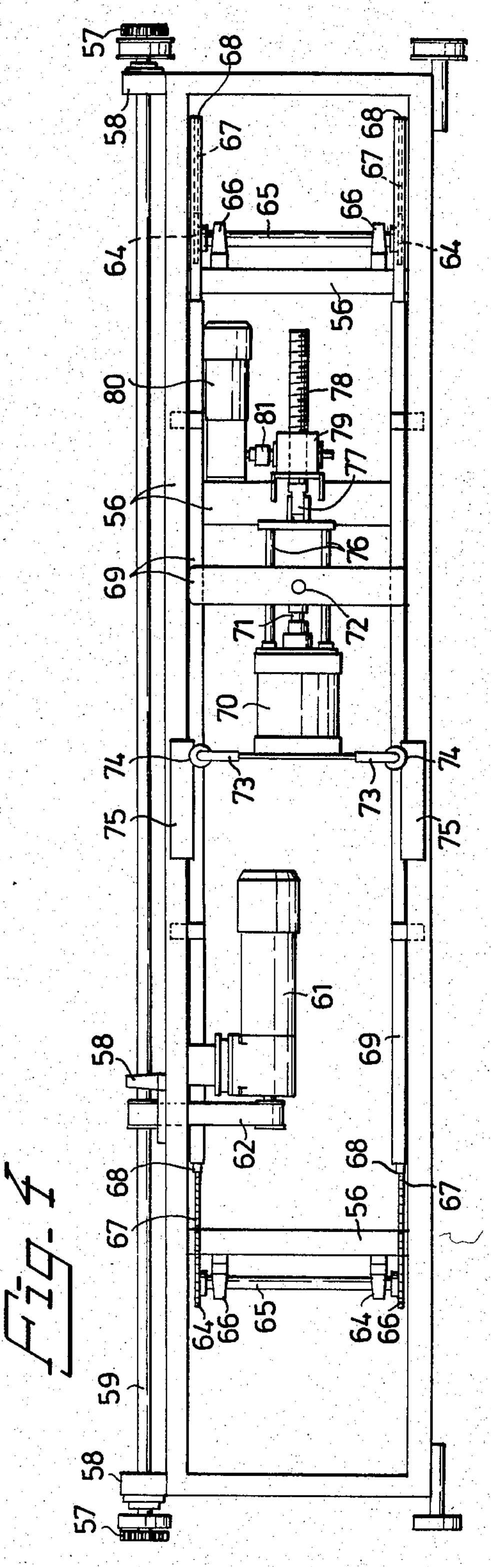
FIG. 4 is a plan view of a movable suction beam carrier incorporated in the plant.

When the slide 69 is moved to the right in FIG. 4, the suction beam 55 is raised. This movement of the slide 69 is effected by means of a piston-cylinder device which is active between the slide and the carriage 56, and which includes a cylinder 70 and a piston rod 71, which is shown in its withdrawn position, and the outer end of which is connected to the slide 69 at 72. The end of the cylinder 70 remote from the piston rod 71 is carried by outwardly projecting arms 73, the outer ends of which carry wheels or rollers 74 having groves in which guide plates 75 fixedly mounted on the carriage 56 are received. Extending from the opposite end of the cylinder 70 are rods 76 which are connected to a screw-threaded rod 78 via a coupling 77. Mounted on the rod 78 is a casing 79 which is carried by the carriage 56 and which accommodates a nut (not shown) which can be turned by means of a motor 80 carried by the carriage 56 via a transmission 81. By turning the nut in the casing 79, it is possible to change the starting position from which the slide 69 is able to move forwards and backwards while raising or lowering the suction beam respectively, when extending and withdrawing the piston rod 71. When unscrewing the nut towards the free end of the rod 78, the whole of the slide 69 is moved to the left in FIG. 4, while lowering the suction beam 55, so that said beam takes a lower starting position from which it can be raised by extending the piston rod 71 from the position shown in FIG. 4. The suction beam 55 and the carriage 56 are connected together by means of link arms 82, 83, which prevent the suction beam from twisting in its transverse direction.

Figure 2:
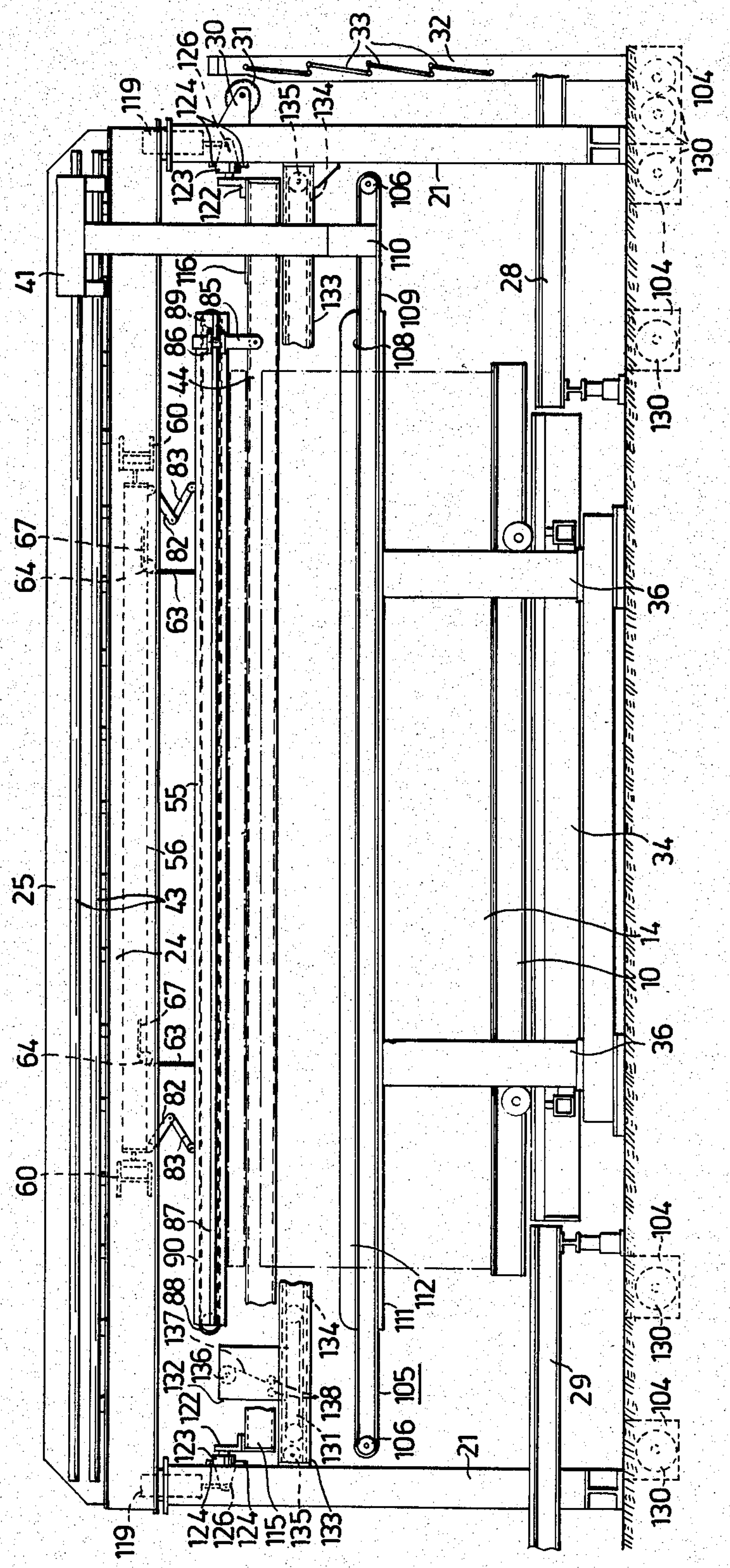
FIG. 2 is a side view of the plant illustrated in FIG. 1, with certain parts broken away so as to illustrate the plant construction more clearly.

As illustrated in FIGS. 1 and 2, each suction beam 55 may be provided with a roller 84, for rolling the underside of the aerated concrete piece 16 or 17 carried by the suction beam, during the transport of said concrete piece from a cutting station 12 or 13 to the stacking station 18. For the purpose of adjusting the thickness of the concrete piece, the roller is journalled in holder 85, which can be raised and lowered in a carriage 86 which is movable along the suction beam 55 and which is carried by longitudinally extending guides 87 on the suction beam. The carriage 86 is driven in substantially the same manner as the carriage 42 described in the aforegoing with reference to FIG. 3. Thus, the suction beam 55 carries at its end a driven and a non-driven guide wheel 88, 89, around which extends a toothed belt 90 or like device, which is connected to the carriage 86.

As illustrated in FIG. 1 the carriages 41, 42 may support, in a corresponding manner, rollers 91 for rolling the upper sides of the aerated concrete bodies 14, 15 or of the remaining aerated concrete body parts present in the cutting stations 12, 13, so as to provide a smooth upper surface on the separated aerated concrete pieces 16, 17, thereby to facilitate lifting of said pieces by means of the suction beams 55, and to reduce the tendency of said upper surface of the concrete pieces to stick to the under surface of aerated concrete pieces placed thereon in the stack 20. In order to reduce the risk of the aerated concrete pieces 16, 17 breaking when rolling the upper side thereof with the rollers 91, the rollers should be arranged to act on the upper side of the aerated concrete bodies 14, 15 or the remaining aerated concrete body parts in front of the cutting wires 47. In order to make this possible when cutting in both directions of travel of the carriages 41, 42, the roller 91, in accordance with the FIGS. 1 and 5 embodiment, is rotatably journalled in the upper end of arms 92, said arms being pivotally mounted at their respective lower ends in the arms 45 of associated carriage 41 or 42, the arms 92, in the manner illustrated in FIG. 5 by means of the double arrow 93, being pivotable by means of piston-cylinder devices 94 acting between said arms and the arms 45 in vertical planes which are parallel with the directions of travel of the carriages 41, 42, to positions in which the arms are located either on one side or the other side of the cutting wire 47. The desired rolling pressure can also be maintained by the device 94.

Figure 5:
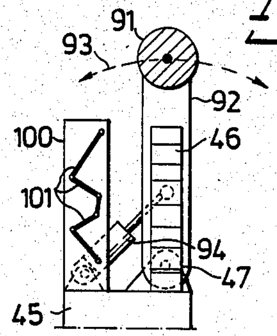
FIG. 5 is a sectional view of a movable carrier for a cutting wire arranged to make a horizontal cut, the carrier also supporting means for rolling the upper side of and for profiling the side edges of a piece of aerated concrete separated from an aerated concrete body by said cutting wire.
Figure 6:
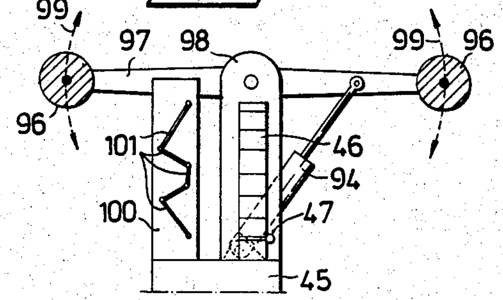
FIG. 6 is a sectional view according to FIG. 5 of a modified embodiment of the cutting-wire carrier.

FIG. 6 illustrates an alternative embodiment of the arrangement shown in FIG. 5, in which two rollers 96 are carried on a respective side of the cutting wire 47 carried by the cutting-wire attachment 46 on opposite ends of an arm 97, which is pivotally mounted on the upper end of a fixed arm 98 upstanding from arm 45. The arm 97 can be swung in the manner shown by the arrows 99, by means of a piston-cylinder device 94 acting between the arms 45 and 97, so as to bring the rollers 96, one at a time, into contact with the upper side of an aerated concrete body 14, 15 or an aerated concrete body part.

As shown in FIGS. 1, 5 and 6, at least the one carriage 41 can also be provided with means for profiling the side edges of the aerated concrete pieces 16, in conjunction with dividing the concrete body 14 into said pieces 16. As shown in the drawing, said profiling means includes plates 100 which are carried by the arms 45 and which carry cutting wires 101 extending between cutting-wire attachments, said cutting-wire attachments being so arranged that the cutting wires 101 stretched therebetween form a groove 102 in one of the mutually opposite side edges of the pieces 16, and a tongue 103 in the other of said side edges.

The waste formed when profiling the aerated concrete pieces is collected by conveying means located on mutually opposite sides of the aerated concrete body 14, and is transported to waste collecting stations 104 at opposite ends of the cutting station 12. Each of the conveying means illustrated in FIGS. 1 and 2 comprises an endless conveyor belt 105, which extends along the cutting station 12 and around guide rollers 106 located above a respective one of the collecting stations 104. The conveying belts 105 are carried by the vertical casings 36 associated with cutting station 12, via holders 107, and may, to advantage, in the shown manner, have horizontal upper and lower parts 108, 109 and may be so driven that the waste-receiving upper horizontal part 108 always moves in a direction opposite to the direction of movement of the associated carriage 41. To this end, the carriage 41 is connected to the lower parts 109 of the conveyor belt 105, via lower, inwardly angled arms 110, whereby the conveyor belt 105 is driven by the carriage 41 in the direction desired. The reference 111 identifies support sections carried by the casings 36 and supporting the lower parts 109 of the conveyors 105, while the reference 112 identified waste-conducting means carried by the holders 107; the waste-conducting means are preferably made of a soft material, such as rubber, and conduct the waste material created by the profiling means 100, 101 to the conveyor 105.

Figure 7:
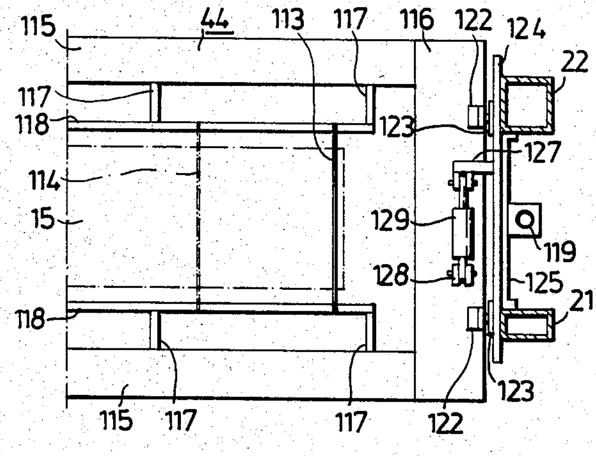
FIG. 7 is a plan view of an end part of a transverse-cutting frame and illustrates means for raising and lowering said frame and means for laterally reciprocating the frame.

Arranged in each cutting station 14, 15 is a transverse-cutting frame generally referenced 44, which is illustrated in FIGS. 1, 2 and 7 and which carries cutting wires 113 which extend in the direction of movement of the transport means 48 and which are intended to cut the outermost end parts of the aerated concrete pieces 16, 17 separated by means of cutting means 47. As indicated at 114 in FIG. 7, optionally additional cutting wires may be provided for dividing the aerated concrete pieces 16, 17 into blocks, while said pieces still rest on an underlying aerated concrete body part. Each transverse-cutting frame 44 comprises frame beams 115 which extend along a respective cutting station 12 or 13 and which are connected together at the ends by means of transverse frame pieces 116. The frame beams 115 carry, via holders 117, two wire attachment rods 118 between which the transverse cutting wires 113, 114 extend, each of said attachment rods extending along its respective one of said beams 115. In the illustrated embodiment, the cutting frames 44 can be raised and lowered by means of piston-cylinder devices 119 acting between said frames and the main frame of the apparatus, between an upper position shown in FIGS. 1 and 2, in which position the frames permit the cutting wire carriages 41, 42 to move between their terminal positions for the purpose of cutting the aerated concrete pieces 16, 17 by means of the cutting wires 47, and a lower position indicated at 120 in FIG. 1, in which the transverse-cutting wires 113, 114, have completely cut through the said separated aerated concrete pieces 16, 17. The transverse cutting frames 44 are also preferably adjustable to an intermediate position, indicated at 121 in FIG. 1, by means of the piston-cylinder device 119, in which intermediate position the cutting frames are spaced from the upper side of the separated aerated concrete pieces 16, 17, to permit said upper side to co-act with associated suction beams 55, while the cutting wires 113, 114 of said cutting frames are located above the remaining aerated concrete body parts located beneath the separated aerated concrete pieces 16, 17, i.e. above the horizontal cut made by the cutting wires 47. This latter arrangement ensures that there is no risk of the cutting wires 113, 114 of the transverse-cutting frames 44 damaging the corners of the remaining aerated concrete body pieces when the transverse-cutting frames 44 are raised to their said upper position. The transverse-cutting frame can also be provided with means for imparting thereto a reciprocatory movement which facilitates the transverse-cutting operation and which is substantially parallel with the direction of the transverse-cutting wires 113, 114. These last mentioned means are illustrated in FIGS. 2 and 7, in which the transverse-cutting frame 44 is supported at either end by wheels or rollers 123 journalled in holders 122. These wheels 123 are arranged between horizontal guides 124 carried by a plate 125 which, in turn, is vertically movable and is guided by two vertical posts 21, 22 forming part of the apparatus main frame. In this respect, each piston-cylinder device 119 acts between the main frame which carries the cylinder of the device 119 and an attachment 126 which is fixed to the plate 125 and which secures the outer piston-rod end of the device 119. Thus, the frame 44 is carried by the plate 125 via the wheels 123 arranged in the guides 124. Acting between an attachment 127 on each plate 125 and an attachment 128 on the frame 44, adjacent each of the ends of said frame, is a substantially horizontally arranged piston-cylinder device 129, wherewith the frame 44 can be imparted a transversely directed, substantially horizontal, reciprocatory movement, during which the wheels 123 move along the guides 124.

In the illustrated embodiment, the aforementioned stations 104 for collecting waste formed by profiling the aerated concrete pieces comprise floor gullies which extend transversely of the apparatus and in which the waste, optionally slurried with water, is carried away by means of conveyor screws 130 to a collecting or consuming station. Similar floor gullies 104 provided with conveyor screws 130 can be arranged, in the manner illustrated in FIG. 2, to receive and to carry away the waste obtained when cutting outer layers from the aerated concrete bodies 14, 15 by means of the means 31 and 33 and the waste obtained when cutting the outermost end portions of the aerated concrete pieces 16, 17 by means of the cutting wires 113 of the transverse cutting frames 44.

As will be seen from FIGS. 1 and 2, the apparatus according to the invention can also include means for coating selected flat sides or all of the flat sides of the aerated concrete pieces 16, 17 with, for example a binding agent or a release agent, which may be in liquid form or in powder form or in the form of a foil, to maintain or to prevent respectively, binding between said flat sides and an opposing side of an adjacent aerated concrete piece in the stacking station 18. In the illustrated embodiment, these means comprise a carriage 131 which carries means 132 for supplying a coating agent to the upper side of at least certain aerated concrete pieces, while said pieces are stacked in the stacking station 18.

The carriage 131 is supported by guides 133 in a form of two stationary beams which extend along the stacking station 18 on a respective side thereof, said carriage 131 being reciprocatingly movable along the guides 133 between terminal positions, in which positions the carriage is located at such a distance from one or the other end of a stack 20 formed in the station 18 that further aerated concrete pieces 16, 17 can be readily placed on the stack 20. The carriage 131 is driven by a toothed belt 134 or like device connected to the carriage and layed around guide wheels 135 located at mutually opposite ends of the guides 133, of which guide wheels one is drivable by means of a motor (not shown). In the illustrated embodiment the means 132 comprise a reel of foil 136, from which a foil web, shown at 137, is drawn off during movement of the carriage 131 from one terminal position to the other, said foil web, subsequent to being carried around one or the other of two guide rollers 138, being applied to the aerated concrete piece which, at that moment, is uppermost in the stack 20. Since the foil is clamped between the aerated concrete pieces in the stack 20, no special means are required for feeding-out foil when the carriage 131 moves along the guides 133, it being sufficient that one end of the foil is firmly clamped, for example between the support 19 and the lowermost aerated concrete piece 17, when commencing to form a stack 20.

In the illustrated embodiment there is formed in the plant aerated concrete composite items which each comprise two relatively thin aerated concrete pieces 17 and an intermediate, relatively thick aerated concrete piece 16, which may have a lower density, and therewith better heat-insulation properties, but lower mechanical strength than the pieces 17. In this respect there is first cut in station 13 a concrete piece 17 which is gripped and lifted by the suction beam 55, which is connected to a source of negative pressure, of the transport means 48 shown to the right of FIG. 1, said means transporting the concrete piece 17, as its underside is rolled, to the stacking station 18, the support means 19 being held raised, so that the concrete piece 17 has only a very short distance to fall in station 18, from the relowered suction beam 55 to the support means 19, when the negative pressure ceases to act in the suction beam 55. The illustrated right-hand transport means 48 is then returned, to collect from station 13 a further piece 17 of aerated concrete, cut in said station during the transportation of the first mentioned aerated concrete piece 17. Simultaneously herewith, a thicker aerated concrete piece 16 has been cut in the cutting station 12, and profiled to form a grove 102 and a tongue 103, and is lifted, in a manner similar to that described above by the transport means 48 shown to the left in FIG. 1, said transport means conveying the piece 16 to and depositing said piece at the station 18, subsequent to the support means 19 being lowered by an amount corresponding to the thickness of the piece 16. Hereinafter, the right-hand transport means performs two working cycles for each working cycle performed by the left-hand transport means, so as to form in station 18 a composite item comprising two concrete pieces 17 and one concrete piece 16, a layer of anti-stick foil 137 being placed between each such composite item, i.e. between mutually adjacent concrete pieces 17, by means 131, 132. To promote sticking between the concrete pieces 16 and 17 of respective composite items, it is possible to refrain from rolling the surfaces of pieces 16, and also to refrain from rolling that surface on each piece 17 which is to be placed against the surface of a piece 16. It is also possible to arrange in the station 18 further coating means, which may also be movable along the guides 133 and which are operative to coat the upper side of each concrete piece 16 and the upper sides of those pieces 17 on which a piece 16 is to be brought, with an adhesion-promoting agent, for example a slurry of waste taken from gullies 104, and optionally also with a reinforcement. The apparatus is preferably constructed to operate fully automatically, in accordance with a set programme, said apparatus being allowed to run continuously, with interruptions solely for allowing the supply of fresh aerated concrete bodies 14, 15 and for removing finalised stacks 20 and delivering fresh support means 19.

The apparatus may, of course, also be used to produce mutually similar items in the cutting stations 12, 13, these pieces being alternately transferred to the station 18 and separated, one from the other, by means of foil, for example plastics foil or aluminium foil.

Figure 8:
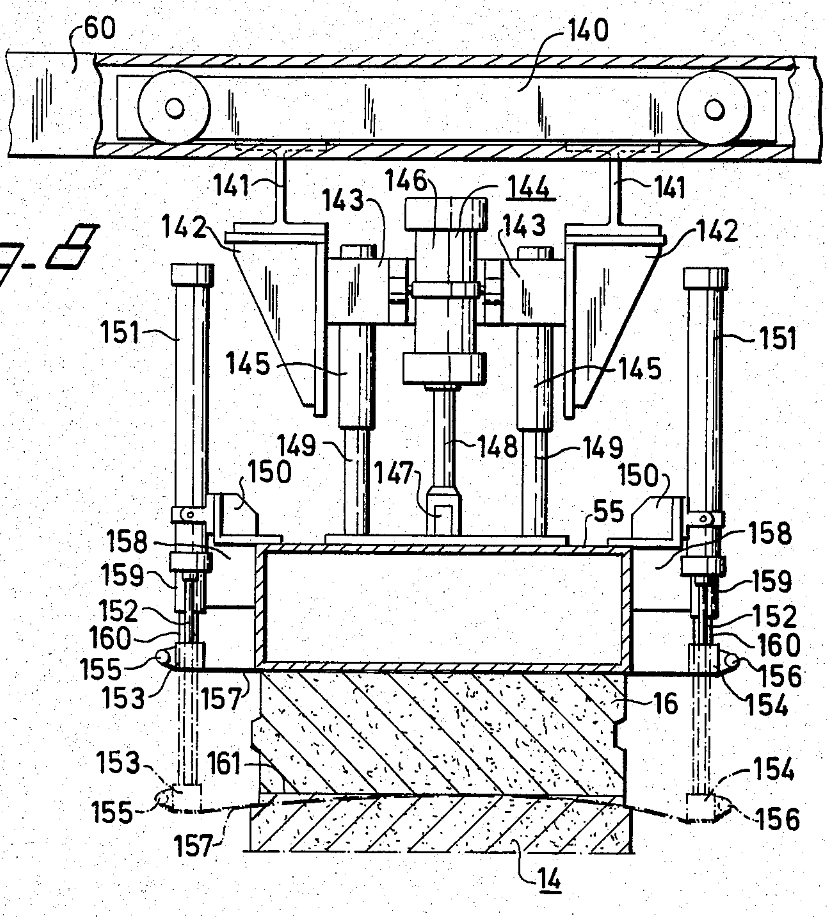
FIG. 8 is a side view of a modified embodiment of a suction-beam carrier with an associated suction beam shown in cross-section and provided with a transverse-cutting arrangement.
Figure 10:
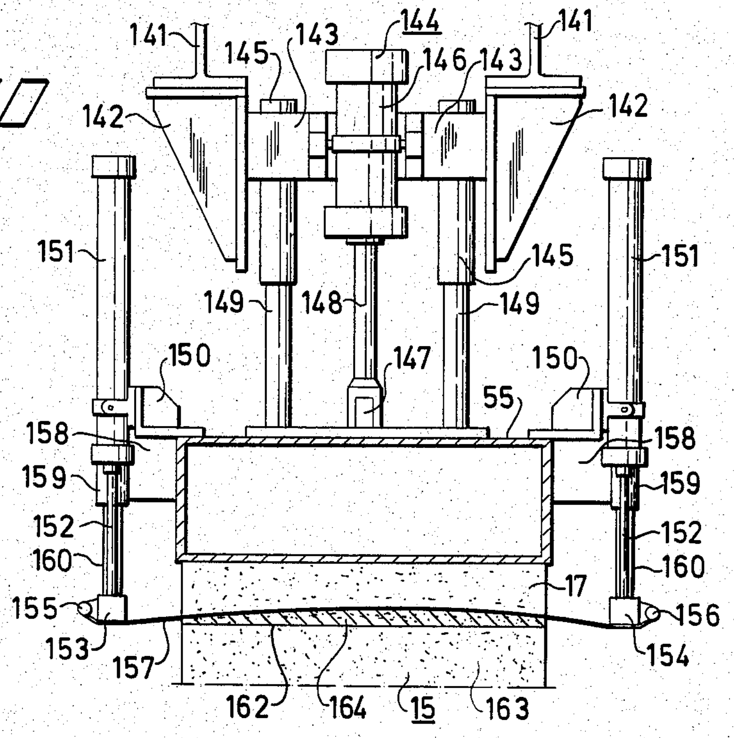
FIGS. 10 and 11 are fragmentary views, otherwise similar to FIG. 8, and illustrate how the transverse-cutting arrangement shown in FIGS. 8 and 9 is used for cutting an aerated concrete piece transversely while said piece is carried by the suction beam.
Figure 11:
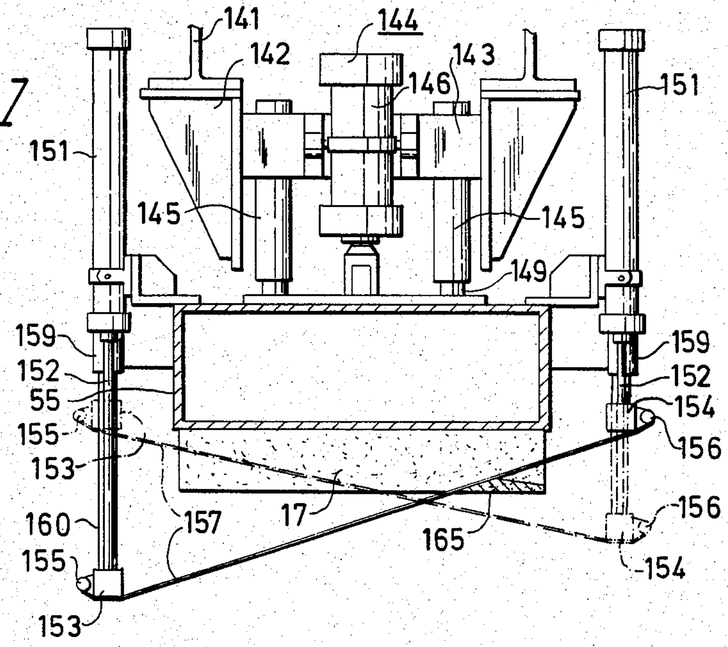

FIGS. 8,11 illustrate an alternative embodiment of the aforedescribed transport means 48. This embodiment also includes a carrier, in the form of carriage 140, for a suction beam 55. The carriage 140 carries piston-cylinder devices, of which one is shown at 144, and guides, of which two are shown at 145, via support beams 141, bracket-like structures 142, and holders 143. In the illustrated case, the cylinder 146 of the device 144 is fixed to holders 143, the suction beam 55 being suspended at 147 from the outer end of the piston rod 148. Each guide 145 has the form of a sleeve, which is stationary relative to the carriage 140 and in which there is arranged for vertical movement a guide rod 149. The piston rod 148 of each piston-cylinder device 144 can be moved between the withdrawn position shown in FIG. 11, and an extended position, such as the position shown in FIG. 8 or that in FIG. 10. The carriage 140 may be arranged for movement along beams 60 in the manner described with reference to the carriages 56 of the transport means 48, between a cutting station corresponding to the cutting station 12 or 13, and a stacking station located therebetween.

The suction beam 55 of the embodiment according to FIGS. 8–11 carries, via holders 150, the cylinders 151 of vertically arranged piston-cylinder devices having downwardly directed piston rods 152. The piston-cylinder devices 151, 152 are arranged opposite one another, in pairs, on the long sides of the suction beam 55. Each pair of piston-cylinder devices 151, 152 carries on the lower end of respective piston rods 152, transverse-cutting arrangements, which include horizontal bars 153, 154 which extend along a respective side of the suction beam 55, each of the bars 153, 154 having arranged thereon one or more attachment means 155, 156 for attachment of the opposite ends of transverse-cutting wires 157. As indicated in chain lines in FIG. 9, the attachment means 155, 156 may be arranged so as to be movable along respective bars 153, 154 and locked in selected positions therealong. Each transverse-cutting wire 157 is arranged in a vertical plane which is substantially parallel with the direction of travel of the carriage 140, i.e. the direction in which the several aerated concrete pieces are transported away. The bars 153, 154 may be shorter than the suction beam 55, and several bars may be arranged in a line along the beam 55, as indicated by the chain lines at 153 in FIG. 9. Each bar 153, 154 is held horizontal by means of guides, each of which includes a vertical guide sleeve 159, which is carried by the suction beam 55 via a holder 158, and a rod 160 which is connected to an associated rod 153 or 154 and which is guided for longitudinal movement in the guide sleeve. The piston-cylinder devices 151, 152 may be arranged to be driven either in pairs between the withdrawn position shown in FIG. 8, in which withdrawn position the cutting wires 157 are located contiguous with the underside of the suction beam 55, and the extended positions shown in, e.g. FIGS. 9 and 10, or individually, so that the cutting wires 157 extend obliguely, in one direction or the other, for example in the manner shown in FIG. 11. In order to make the working made illustrated in FIG. 11 possible, the end of each cutting wire 157 is arranged to be wound onto and unwound from its respective attachment means 155 or 156 against the action of a springforce.

Figure 9:
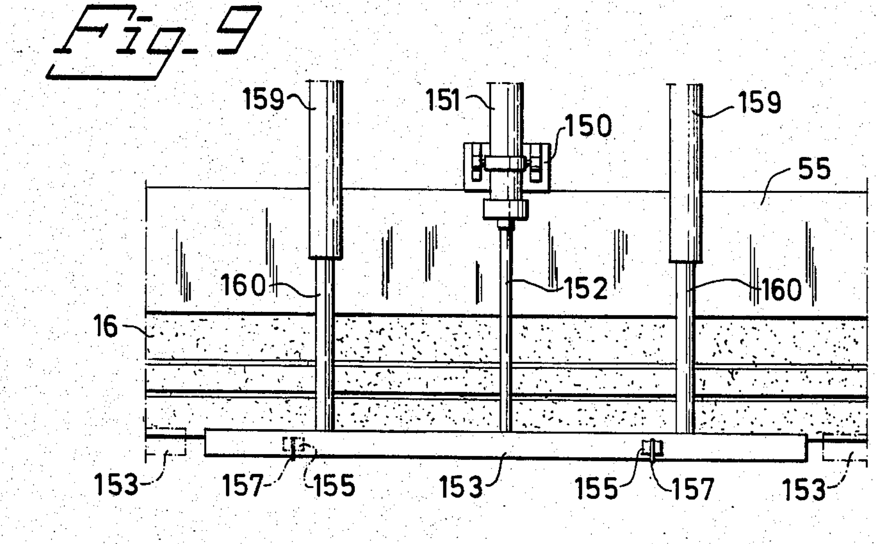
FIG. 9 is a fragmentary view, taken from the right in FIG. 8, showing a centre part of the suction beam with associated transverse-cutting arrangement.

In FIGS. 8 and 9 it is assumed that the suction-beam carrier 140 with associated suction beam 55 is arranged in the cutting station 12 described with reference to FIGS. 1 and 2, in which case the transverse-cutting frame 44 according to FIGS. 1, 2 and 7 may, optionally, be excluded and replaced with the transverse-cutting arrangement 150–160 described with reference to FIGS. 8–11. The starting position when making a transverse cut is shown in full lines in FIG. 8, where each cutting wire 157 lies against the underside of the suction beam 55, which is in turn located immediately adjacent a severed aerated concrete piece 16 cut from an aerated concrete body 14 along a horizontal plane 161. For the purpose of cutting the outermost end portions of the concrete piece 16, and optionally also for dividing said concrete piece into one or more smaller pieces at loactions between the ends thereof, one or more of cutting wires 157 is, or are, lowered by means of the piston-cylinder devices 151, 152 to the position shown in chain lines in FIG. 8 and in full lines in FIG. 9, in which position of the wire, or wires, the aerated concrete piece 16 has been fully severed transversally. The cutting wire 157, or wires, is, or are, then raised to said starting position and the transversally cut concrete piece 16 is transported to the stacking station (18 in FIG. 1), by lifting said concrete piece 16 with the suction beam 55, by means of the piston-cylinder devices 144, and moving the carriage 140 to the stacking station, while transporting the aerated concrete piece 16 to the stacking station, the undersurface of said piece may be smoothed by a roller which, although not shown in FIGS. 8–11, corresponds to the roller 84 in FIG. 1.

In the embodiment illustrated in FIGS. 10 and 11 it is assumed that the suction beam 140 with associated suction beam 55 is arranged in the cutting station 13 described with reference to FIGS. 1 and 2, in which case the transverse-cutting frame described with reference to FIGS. 1, 2 and 7 can optionally be excluded, and replaced with the transverse-cutting arrangement 150–160. In FIGS. 10–11, it is assumed that the aerated concrete piece 17 cut from the upper part of the aerated concrete body 15 along a horizontal cutting plane 162 is to be severed transversally between its ends by the cutting wire 157, but not the underlying aerated concrete piece 163. Consequently, when cutting through the aerated concrete piece 17, the cutting wire must not penetrate or mark the concrete piece 163. With the suction beam 55 located adjacent the upper side of the concrete piece 17, the cutting wire 157 is lowered by means of the piston-cylinder devices 151, 152 to an intermediate position, shown in full lines in FIG. 10, in which intermediate position the whole of the cutting wire 157 located above the cut 162, so as to leave the hatched area 164 in FIG. 10 uncut. The aerated concrete piece 17 is then drawn by suction onto the beam 55 and the beam lifted, together with the concrete piece 17, by means of the piston-cylinder devices 144, whereupon with the aid of associated piston-cylinder devices 151, 152, the one cutting-wire attachment means 155 is rapidly lowered still further, while, at the same time, the other cutting-wire attachment means 156 is rapidly raised to the position shown in full lines in FIG. 11, whereupon the hatched area 164 can be cut through completely or, as shown, partially, so that only a small area 165 remains to be cut. This area 165 is cut by rapidly raising the cutting-wire attachment means 155 and rapidly lowering the cutting-wire attachment means 156 to the position shown in chain lines in FIG. 11. By making transverse cuts in the manner illustrated in FIGS. 10 and 11, it is possible to produce transverse cuts of the quality desired without scoring or marking the upper surface of the aerated concrete body part 163 located beneath the severed concrete piece 17 when such scoring would be visible in the finished product. The transverse cuts according to FIGS. 10 and 11 can be made while transporting the aerated concrete piece to the stacking station.

As will readily be understood, the invention is not restricted to the described and illustrated embodiment thereof, but that modifications may be made within the scope of the following claims.

What is claimed is:

1. An apparatus for dividing substantially parallelepipedic bodies of only partially cured aerated concrete into smaller pieces and for stacking said pieces, said apparatus including a stacking station, two cutting stations located adjacent to and on opposite sides of said stacking station, two first horizontal supports located in a respective one of said cutting stations for supporting a respective one of said concrete bodies, cutting means associated with a respective one of said cutting stations for cutting concrete bodies supported by said first horizontal supports along horizontal cutting planes into substantially parallelepipedic pieces having a thickness which is substantially smaller than the original height of said concrete bodies, a second horizontal support located in said stacking station, and transport means associated with a respective one of said cutting stations and capable of applying a suction force to the upper sides of said pieces for transporting said pieces from an underlying part of the concrete body in respective cutting stations to said second horizontal support and placing the pieces one upon the other to form a stack of said pieces in said stacking station, each of the cutting means comprising a cutting wire which extends across respective cutting stations, substantially parallel with the transport direction of said transport means, between attachments which are carried by a cutting-wire carrier arranged for movement transversely to said transport direction, at least one cutting-wire carrier carrying two rollers, which are located on a respective side of the cutting wire carried by the cutting-wire carrier and which rollers are associated with means for bringing them one at a time into contact with the upper side of an aerated concrete body or body part.

2. An apparatus for dividing substantially parallelepipedic bodies of only partially cured aerated concrete into smaller pieces and for stacking said pieces, said apparatus including a stacking station, two cutting stations located adjacent to and on opposite sides of said stacking station, two first horizontal supports located in a respective one of said cutting stations for supporting a respective one of said concrete bodies, cutting means associated with a respective one of said cutting stations for cutting concrete bodies supported by said first horizontal supports along horizontal cutting planes into substantially parallelepipedic pieces having a thickness which is substantially smaller than the original height of said concrete bodies, a second horizontal support located in said stacking station, transport means associated with a respective one of said cutting stations and capable of applying a suction force to the upper sides of said pieces for transporting said pieces from an underlying part of the concrete body in respective cutting stations to said second horizontal support and placing the pieces one upon the other to form a stack of said pieces in said stacking station, each of the cutting means comprising a cutting wire which extends across respective cutting stations, substantially parallel with the transport direction of said transport means, between attachments which are carried by a cutting-wire carrier arranged for movement transversely to said transport direction, means carried by at least one of said cutting-wire carriers for profiling the side edges of the aerated concrete pieces extending transversely to said transport direction, and means for carrying waste formed during the profiling operation to waste-collecting stations, said waste conveying means comprising a conveyor belt located on each side of the associated cutting station and extending transversely to the transport direction for separated aerated concrete pieces, and means for driving the conveyor belts in a direction opposite to the direction of movement of the associated cutting-wire carrier.

3. Apparatus according to claim 2, wherein the conveyor belts are endless and are provided with a substantially horizontal, waste-receiving upper part and a substantially horizontal lower part which is attached to the associated cutting-wire carrier.

4. An apparatus for dividing substantially parallelepipedic bodies of only partially cured aerated concrete into smaller pieces and for stacking said pieces, said apparatus including a stacking station, two cutting stations located adjacent to and on opposite sides of said stacking station, two first horizontal supports located in a respective one of said cutting stations for supporting a respective one of said concrete bodies, cutting means associated with a respective one of said cutting stations for cutting concrete bodies supported by said first horizontal supports along horizontal cutting planes into substantially parallelepipedic pieces having a thickness which is substantially smaller than the original height of said concrete bodies, a second horizontal support located in said stacking station, transport means associated with a respective one of said cutting stations and capable of applying a suction force to the upper sides of said pieces for transporting said pieces from an underlying part of the concrete body in respective cutting stations to said second horizontal support and placing the pieces one upon the other to form a stack of said pieces in said stacking station, and a transverse-cutting frame in each cutting station which carries cutting wires extending in the transport direction of said transport means, for cutting the aerated concrete pieces while said pieces rest on an under-lying body part of aerated concrete, said frame being raisable and lowerable between an upper position in which it permits an aerated concrete piece to be cut from the aerated concrete body or body part by means of said cutting means, a lower position in which its cutting wires have completely cut through the severed aerated concrete piece, and an intermediate position in which it exposes the upper side of a severed aerated piece for co-action with an associated transport means while the cutting wires of said frame are located above the remaining aerated concrete body part located beneath the severed aerated concrete piece.

5. Apparatus according to claim 4, wherein means are provided for causing each transverse cutting frame to reciprocate substantially parallel to the direction of the cutting wires of said transverse cutting frames.

6. An apparatus for dividing substantially parallelepipedic bodies of only partially cured aerated concrete into smaller pieces and for stacking said pieces, said apparatus including a stacking station, two cutting stations located adjacent to and on opposite sides of said stacking station, two first horizontal supports located in a respective one of said cutting stations for supporting a respective one of said concrete bodies, cutting means associated with a respective one of said cutting stations for cutting concrete bodies supported by said first horizontal supports along horizontal cutting planes into substantially parallelepipedic pieces having a thickness which is substantially smaller than the original height of said concrete bodies, a second horizontal support located in said stacking station, and transport means associated with a respective one of said cutting stations and capable of applying a suction force to the upper sides of said pieces for transporting said pieces from an underlying part of the concrete body in respective cutting stations to said second horizontal support and placing the pieces one upon the other to form a stack of said pieces in said stacking station, said transport means comprising two box-like substantially horizontal suction beams which are connectable to a source of negative pressure and are supported by associated carriers, which are arranged for movement between said stacking station and a respective cutting station, at least one of the suction beams carrying at least one pair of attachment means, the attachment means of said pair or each pair being located on mutually opposite long sides of said beam, for the attachment of the opposite end portions of a transverse-cutting wire, said attachment means being raisable and lowerable between an upper position, in which the transverse-cutting wire is located contiguous with the underside of the suction beam, and at least one lower position, in which said wire is spaced from the underside of said beam.

7. Apparatus according to claim 6, wherein each of said attachment means can be raised and lowered individually.

8. Apparatus according to claim 6, wherein the attachment means can be adjusted to selected positions along the length of the suction beam.

9. An apparatus for dividing substantially parallelepipedic bodies of only partially cured aerated concrete into smaller pieces and for stacking said pieces, said apparatus including a stacking station, two cutting stations located adjacent to and on opposite sides of said stacking station, two first horizontal supports located in a respective one of said cutting stations for supporting a respective one of said concrete bodies, cutting means associated with a respective one of said cutting stations for cutting concrete bodies supported by said first horizontal supports along horizontal cutting planes into substantially parallelepipedic pieces having a thickness which is substantially smaller than the original height of said concrete bodies, a second horizontal support located in said stacking station, and transport means associated with a respective one of said cutting stations and capable of applying a suction force to the upper sides of said pieces for transporting said pieces from an underlying part of the concrete body in respective cutting stations to said second horizontal support and placing the pieces one upon the other to form a stack of said pieces in said stacking station, said transport means comprising two box-like substantially horizontal suction beams which are connectable to a source of negative pressure and are supported by associated carriers, which are arranged for movement between said stacking station and a respective cutting station. at least one of the suction beams carrying at least one pair of attachment means for the attachment of the opposite end portions of a transverse-cutting wire, the attachment means of said pair or each pair being located on mutually opposite long sides of said beam and being individually raisable and lowerable between an upper position, in which the transverse-cutting wire is located contiguous with the underside of the suction beam, and at least one lower position, in which said wire is spaced from the underside of said beam.

10. An apparatus according to claim 9, wherein the attachment means are adjustable to selected positions along the length of the suction beam.

11. An apparatus for dividing substantially parallelepipedic bodies of only partially cured aerated concrete into smaller pieces and for stacking said pieces, said apparatus including a stacking station, two cutting stations located adjacent to and on opposite sides of said stacking station, two first horizontal supports located in a respective one of said cutting stations for supporting a respective one of said concrete bodies, cutting means associated with a respective one of said cutting stations for cutting concrete bodies supported by said first horizontal supports along horizontal cutting planes into substantially parallelepipedic pieces having a thickness which is substantially smaller than the original height of said concrete bodies, a second horizontal support located in said stacking station, and transport means associated with a respective one of said cutting stations and capable of applying a suction force to the upper sides of said pieces for transporting said pieces from an underlying part of the concrete body in respective cutting stations to said second horizontal support and placing the pieces one upon the other to form a stack of said pieces in said stacking station, each of the cutting means comprising a cutting wire which extends across respective cutting stations, substantially parallel with the transport direction of said transport means, between attachments which are carried by a cutting-wire carrier arranged for movement transversely to said transport direction, the cutting-wire carrier of at least one of said cutting means carrying a roller for rolling the upper side of an aerated concrete body or body part, said roller being movable relative to the associated cutting-wire carrier between positions in which it engages said upper side of the concrete body or body part on one or the other side respectively of said cutting wire carried by the cutting-wire carrier.

12. An apparatus according to claim 11, comprising means carried by at least one of said cutting-wire carriers for profiling the side edges of the aerated concrete pieces extending transversely to said transport direction, and means for carrying waste formed during the profiling operation to waste-collecting stations, said waste conveying means comprising a conveyor belt located on each side of the associated cutting station and extending transversely to the transport direction for separated aerated concrete pieces, and means for driving the conveyor belts in a direction opposite to the direction of movement of the associated cutting-wire carrier.

13. An apparatus according to claim 12, wherein the conveyor belts are endless and are provided with a substantially horizontal, waste-receiving upper part and a substantially horizontal lower part which is attached to the associated cutting-wire carrier.

14. An apparatus according to claim 11, comprising a transverse-cutting frame in each cutting station which carries cutting wires extending in the transport direction of said transport means, for cutting the aerated concrete pieces while said pieces rest on an underlying body part of aerated concrete, said frame being raisable and lowerable between an upper position in which it permits an aerated concrete piece to be cut from the aerated concrete body or body part by means of said cutting means, a lower position in which its cutting wires have completely cut through the severed aerated concrete piece, and an intermediate position in which it exposes the upper side of a severed aerated concrete piece for co-action with an associated transport means while the cutting wires of said frame are located above the remaining aerated concrete body part located beneath the severed aerated concrete piece.

15. An apparatus according to claim 11, wherein said transport means comprises two box-like substantially horizontal suction beams which are connectable to a source of negative pressure and are supported by associated carriers, which are arranged for movement between said stacking station and a respective cutting station, at least one of the suction beams carrying at least one pair of attachment means, the attachment means of said pair or each pair being located on mutually opposite long sides of said beam, for the attachment of the opposite end portions of a transverse-cutting wire, said attachment means being raisable and lowerable between an upper position, in which the transverse-cutting wire is located contiguous with the underside of the suction beam, and at least one lower position, in which said wire is spaced from the underside of said beam.

16. An apparatus according to claim 15, wherein each of said attachment means can be raised and lowered individually.

17. An apparatus according to claim 15, wherein the attachment means can be adjusted to selected positions along the length of the suction beam.

18. An apparatus according to claim 14, wherein means are provided for causing the cutting frames to reciprocate substantially parallel to the direction of the cutting wires of said cutting frames.

* * * * *